United States Patent [19]

Toyofuku et al.

[11] Patent Number: 4,834,797

[45] Date of Patent: May 30, 1989

[54] FAT-DESENSITIZING COMPOSITION FOR LITHO PRINTING PLATES COMPRISING PHYTIC ACID, POLYETHYLENE GLYCOL AND A GLYCOL COMPOUND

[75] Inventors: Kunitaka Toyofuku, Sakura; Yasuyoshi Morita, Tokyo; Kohei Michikawa, Yokohama, all of Japan

[73] Assignee: Oji Paper Company, Ltd., Tokyo, Japan

[21] Appl. No.: 262,057

[22] Filed: Oct. 24, 1988

Related U.S. Application Data

[63] Continuation of Ser. No. 938,899, Dec. 8, 1986, abandoned.

[30] Foreign Application Priority Data

Dec. 20, 1985 [JP] Japan ............................ 60-285774

[51] Int. Cl.[4] ........................ C09D 5/20; C09K 3/00

[52] U.S. Cl. .................................... 106/2; 430/104; 101/451

[58] Field of Search ......................... 430/104; 106/2; 101/451

[56] References Cited

U.S. PATENT DOCUMENTS

| | | | |
|---|---|---|---|
| 3,738,850 | 6/1973 | Radell et al. | 106/2 |
| 3,829,319 | 8/1974 | Suzuki et al. | 106/2 |
| 4,282,811 | 8/1981 | Kuzuwata et al. | 106/2 |
| 4,579,591 | 4/1986 | Suzuki et al. | 106/2 |

FOREIGN PATENT DOCUMENTS

| | | |
|---|---|---|
| 144201 | 2/1976 | European Pat. Off. . |
| 135031 | 3/1985 | European Pat. Off. . |
| 217661 | 4/1987 | European Pat. Off. . |
| 2807396 | 8/1978 | Fed. Rep. of Germany . |
| 2211887 | 8/1974 | France . |

OTHER PUBLICATIONS

Patent Abstracts of Japan, vol. 10, No. 2 (M-444) [2059], Jan. 8, 1986; & JP-A-60 168 694 (Ouji Seishi K. K.).

Patent Abstracts of Japan, vol. 7, No. 50 (M-197) [1195], Feb. 26, 1983; & JP-A-57 199 694 (Ouji Seishi K. K.).

*Primary Examiner*—J. David Welsh

*Attorney, Agent, or Firm*—Armstrong, Nikaido, Marmelstein, Kubovcik & Murray

[57] ABSTRACT

A composition useful for rapidly and safely effecting a fat-desensitizing treatment for litho printing plates with a high efficiency, and for providing a hydrophilic membrane having a high durability in printing operations on the surfaces of the litho printing plates, comprises (A) a phytic acid or its functional derivative; (B) a metal salt of the formula $MX_l$, wherein M=a divalent metal cation, X=monovalent or divalent anion and l=1 or 2; (C) a glycol compound of the formula, $R_1—O—(C_nH_{2n}O)_m—R_2$, $R_1$ and $R_2$ = —H, —$COCH_3$, —$CH_2OC_2H_5$, —$C_2H_5OC_4H_7$,

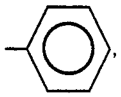

or $C_{1-4}$ alkyl, $n$=1, 2 or 3, and $m$=1, 2, 3 or 4; and (D) a polyethylene glycol.

9 Claims, No Drawings

FAT-DESENSITIZING COMPOSITION FOR LITHO PRINTING PLATES COMPRISING PHYTIC ACID, POLYETHYLENE GLYCOL AND A GLYCOL COMPOUND

This application is a continuation of application Ser. No. 938,899, filed Dec. 8, 1986, now abandoned.

BACKGROUND OF THE INVENTION (1) Field of the Invention

The present invention relates to a fat-desensitizing for a litho printing plate. In particular, the present invention relates to a liquid composition useful for a fat-desensitizing treatment for a litho printing plate comprising an electroconductive substrate plate and an electrophotographic photosensitive layer thereon.

The term "fat-desensitizing" refers to a desensitization of non-image formed portions in a litho printing plate face for printing ink for lithography.

(2) Description of the Related Art

It is known that a litho printing plate having printing images formed on a printing plate face by electrophotography is composed of a sheet substrate and a photoconductive layer containing, as a principal component, a photoconductive substance, for example, zinc oxide.

In a method for the preparation of the printing images, a photosensitive layer on a litho printing plate is exposed to light through a negative or positive mask having a desired pattern of images and the photosensitive layer is developed with a commercially available toner.

In another method for producing an offset litho printing plate, a printing base plate is prepared by forming an image-receiving layer comprising an inorganic pigment and a resinous binder on a surface of a sheet substrate, electrophotographic images are separately formed on a photoconductive transfer drum, for example, a selenic drum, and the images on the drum are transferred to the image-receiving layer.

In a still another method for an offset litho printing plate, desired images are formed on an image-receiving layer in a printing base plate by hand-writing or typing with an oil paint. This method is the so-called direct image-formed offset masterproducing method.

In the offset litho printing plate, the printing plate face has image-formed portions and non-image-formed portions thereof. The non-image-formed portion must be hydrophilic and, therefore, a fat-desensitizing treatment must be applied to the non-image-formed portion. Paricularly, in the litho printing plate having a photoconductive layer, since the non-image-formed portions of the photosensitive layer must be primarily hydrophilic, but usually exhibit a considerably intense lipophilic property, the fat-desensitizing treatment must be applied to the non-image-formed portions of the printing plate face.

If the fat-desensitizing treatment is insufficiently carried out, the resultant non-image-formed portions of the printing plate face are stained during the printing procedures. Especially, where the printing procedures are continued, over a long period of time, the stains on the non-image-formed portions of the printing plate face make it impossible to stably produce clear prints free from stains.

As the fat-desensitization treating liquid, i.e., an etching liquid for the printing plate face, the following liquids are known:

(1) Treating liquids containing, as a principal component, at least a salt selected from organic acid salts and inorganic acid salts, as disclosed in Japanese Examined Patent Publication No. 43-28404.

(2) Treating liquids containing, as a principal component, at least a member selected from ferrocyanide salts and ferricyanide salts, as disclosed in Japanese Examined Patent Publication No. 39-8416.

(3) Treating liquid containing, as a principal component, phytic acid, as disclosed in Japanese Examined Patent Publication No. 45-24609.

The inorganic or organic salt treating liquid (1) is disadvantageous in that it has a low fat-desensitizing effect and, therefore, stains are formed on the resultant prints, and is unsatisfactory when attempting to provide a litho printing plate capable of continuously producing a number of clear prints over a long period of time.

The ferrocyanide or ferricyanide salt-containing fat-desensitizing liquid (2) exhibits a greater fat-desensitizing effect than that of the inorganic or organic salt-containing fat desensitizing liquid (1), but the level of the effect is still unsatisfactory. Therefore, when the fat-desensitizing liquid (2) is utilized for a printing process for neutral paper, which frequently generates paper powder, or for a printing procedure under a high printing pressure, printing stains are easily generated on the resultant prints. The fat-desensitizing liquid (2) is also disadvantageous in that it has a poor stability to heat and light.

Also, the fat-desensitizing liquid (2) contains cyan ion ($CN^-$), which is toxic to the human body. Usually, the ferrocyan ion $(Fe(CN)_6)^{4-}$ and the ferricyan ion $(Fe(CN)_6)^{3-}$ are chemically stable and harmless to the human body. However, the ferrocyan ion and ferrcyan ions could be decompose and be converted to the toxic cyan ions under certain environmental conditions. Accordingly, the fat-desensitizing liquid (2) must be used with the greatest circumspection, to prevent a chemical decomposition of the ferrocyan or ferricyan ion.

In order to eliminate the above-mentioned disadvantages of the fat-desensitizing liquids (1) and (2), the phytic acid- containing fat-desensitizing liquid (3) was provided. However, the fat-desensitizing liquid (3) exhibits a poor chelating property and an unsatisfactory fat-desensitizing effect and, therefore, cannot be industrially utilized.

In consideration of the above-mentioned circumstances, there is a strong demand for the provision of a new fat- desensitizing composition free from the above-mentioned disadvantages.

Because phytic acid and its functional derivatives are nonpoisonous and harmless to the human body, but per se exhibit an unsatisfactory fat-desensitizing activity, they are believed to be useless as a fat-desensitizing agent. Nevertheless, the inventors of the present invention have attempted to utilize them as a component for an industrial useful fat-desensitizing composition.

SUMMARY OF THE INVENITON

A object of the present invention is to provide a fat-desensitizing composition for litho printing plates, having an excellent fat-desensitizing effect, a superior stability to heat and light, a harmlessness to the human body.

Another object of the present invention is to provide a fat-desensitizing composition for litho printing plates, which is useful for rapidly forming a tenacious, hydrophilic membrane on non-image-formed portions of a printing plate face, to strengthen the printing durability of the printing plates, and to improve the quality of the resultant prints.

The above-mentioned objects are atained by the fat-desensitizing composition of the present invention for litho printing plates, which composition comprises (A) a phytic acid component consisting of at least one member selected from the group consisting of phytic acid and functional derivatives thereof; (B) a metal salt component consisting of at least one member selected from the group consisting of the compounds of the formula (I): $MX_l$, wherein M represents a divalent metal cation, X represents a member selected from monovalent and divalent anions, and l represents an integer of 1 or 2, and hydrates of the above-mentioned metal salts; (C) a glycol compound component consisting of at least one glycol compound of the formula (II)

$$R_1-O\text{-}(C_nH_{2n}O)_m\text{-}R_2 \quad (II)$$

wherein $R_1$ and $R_2$ respectively represent, independently from each other, a member selected from the group consisting of a hydrogen atom, radicals of the formulae: $-COCH_3$, $-CH_2OC_2H_5$, and $-C_2H_5OC_4H_9$, a benzyl radical and alkyl radicals having 1 to 4 carbon atoms, n represents an integer of from 1 to 3 and m represents an integer of from 1 to 4; and (D) a polyethylene glycol component consisting of at least one polyethylene glycol.

DESCRIPTION OF THE PREFERRED EMBODIMENTS

The fat-desensitizing composition of the present invention comprises a phytic acid component (A), a metal salt component (B), a glycol compound component (C), and a polyethylene glycol component (D), as defined hereinabove. Separately, the components (A), (B), (C) and (D) per se substantially do not have a satisfactory fat-desensitizing activity for a litho printing plate face, and are useless for making the printing plate face hydrophilic. Nevertheless, when the components (A), (B), (C), and (D) are mixed together, the resultant composition exhibits an excellent fat-desensitizing activity and is capable of rapidly forming a tenacious, hydrophilic membrane, on the printing plate face. Therefore, the fat-desensitizing composition of the present invention effectively causes the resultant litho printing plate to exhibit an improved printing property and an enhanced printing durability.

In the fat-desensitizing composition of the present invention, the phytic acid component (A) consists of at least one member selected from the group consisting of phytic acid of the formula:

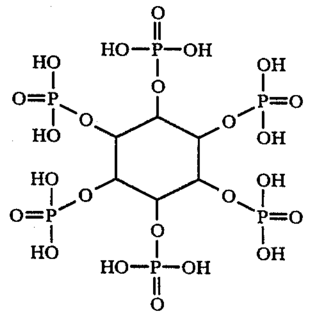

and functional derivatives thereof.

The functional derivatives of phytic acid include water-soluble monovalent and divalent metal salts of phytic acid, for example, sodium phitate, potassium phitate, and calcium phytate.

It is known that the phytic acid and its functional derivatives as mentioned above are reactive with metal ions derived from metal compounds, for example, metal oxides such as ZnO, $TiO_2$, and CaO, to form metal chelate compounds. But, it is also known that an aqueous solution containing phytic acid or a functional derivative thereof alone is not satisfactorily effective for fat-desensitizing the litho printing plate face.

When a fat-desensitizing liquid containing phytic acid or a functional derivative thereof is applied to a face of a litho printing base plate, for example, an electrophotographic offset printing base plate having a photosensitive layer containing a photoconductive material, for example, zinc oxide, and a resinous binder, in the first stage of this process, zinc ions generated in the zinc oxide-containing photosensitive layer are dissolved in the fat-desensitizing liquid and react with the phytic acid or the derivative thereof in a molar ratio of zinc ions to phytic acid or the derivative thereof of from 4:1 to 6:1, to form a zinc-chelate compound. Then, in the second stage of this process, the resultant zinc chelate compound is gradually deposited on the face of the printing plate to form a hydrophilic membrane, thus making the printing plate face hydrophilic.

That is, the hydrophilic membrane is formed in the above-mentioned two steps. Accordingly, when the fat-desensitizing liquid containing, as a principal component phytic acid or a derivative thereof is applied, the hydrophilic membrane-forming rate on the litho printing plate face is lower than that of the ferrocyanide or ferricyanide-containing fat-desensitizing liquid. Therefore, the phytic acid and the functional derivatives thereof per se are not satisfactorily useful as a fat-desensitizing agent.

In order to eliminate the above-mentioned disadvantage and to accelerate an immediate deposition of the zinc chelate compound on the printing plate face, without hindering the reaction of the dissolved zinc ions with the phytic acid or the functional derivative thereof, an attempt was made to provide an improved fat-desensitizing liquid containing phytic acid or a functional derivative thereof and specific metal ions which exhibited a lower chelate stability constant for phytic acid or its derivative than that of zinc ions and which were in an amount of 1 to 10 moles per mole of phytic acid or the derivative thereof. It was found that the attempted fat-desensitizing liquid exhibited a significantly enhanced hydrophilic membrane-forming rate. However, the level of the enhanced rate was still not high enough from the view point of that demanded in practice. From the above, it was assumed that since the zinc oxide particles in the photosensitive layer are covered with a very thin layer of the resinous binder, the contact between the treating liquid and the zinc oxide particles can be attained only after the treating liquid penetrates the resinous binder layer and reaches the zinc oxide particles. This penetration takes a long time.

In an attempt to eliminate the above-mentioned disadvantage, a solvent, for example, methylethylketone, was added to the treating liquid to dissolve the thin resinous binder layer covering the zinc oxide particles and thus allow directly expose the zinc oxide particles to the treating liquid. However, the solvent caused an excessive removal of the resinous binder in the photosensitive layer and dissolve the thin resinous binder layer covering the zinc oxide particles and thus allow directly expose the zinc oxide particles became free from the binding.

In the fat-desensitizing composition of the present invention, the hydrophilic membrane-forming rate thereof was successfully enhanced to a satisfactorily high level suitable for industrial use by selectively utilizing an additive which does not dissolve the resinous binder in the photosensitive layer but merely causes the resinous binder to swell with an appropriate intensity.

Namely, in the present invention, an additive consisting of the metal salt component (B), the glycol compound component (C), and the polyethylene glycol component (D) is added to the phytic acid component (A). The resultant fat-desensitizing composition is able to form the desired tenacious, hydrophilic membrane on the printing plate face at a satisfactorily high rate.

In the composition of the present invention, the metal salt component (B) consists of at least one member selected from the group consisting of the compounds of the formula (I):

$$MX_l \quad (I)$$

wherein M represents a divalent metal cation, X represents a member selected from monovalent and divalent anions; and l represents an integer of 1 or 2, i.e., when X is a monovalent anion, l is 2, and when X is a divalent anion, l is 1, and hydrates of the above-mentioned compounds.

In the formula (I), the divalent metal ions represented by M are preferably nickel, manganese, magnesium, cobalt, copper (II), and calcium ions, and the anions represented by X are preferably sulfate ion, acetate ion, halogen ions, for example, chlorine, bromine, and iodine ions, citrate ion, monohydrogen phosphate ion, and dihydrogen phosphate ion.

Generally, the metal salts and hydrates thereof usable for the metal salt component (B) of the fat-desensitizing composition of the present invention include nickel sulfate, nickel acetate, nickel chloride, nickel bromide, nickel iodide, nickel citrate, manganese sulfate, manganese acetate, manganese chloride, manganese bromide, manganese iodide, manganese citrate, magnesium sulfate, magnesium acetate, magnesium chloride, magnesium bromide, magnesium iodide, cobalt sulfate, cobalt acetate, cobalt chloride, cobalt bromide, cobalt iodide, copper sulfate, copper acetate, copper (II) chloride, copper bromide, calcium acetate, calcium dihydrogen phosphate, calcium chloride, calcium bromide, and calcium iodide, and hydrates of the above-mentioned metal salts.

The metal salt component (B) in the composition of the present invention is effective for promoting the chelate reaction of zinc ions with the phytic acid component (A) and the deposition of the resultant zinc chelate compound.

In the composition of the present invention, the glycol compound component (C) is effective for promoting the reaction of the phytic acid component (A) with zinc oxide in the photosensitive layer and for accelerating the formation of the hydrophilic membrane.

The glycol compound component (C) consists of at least one member selected from the compounds of the formula (II):

$$R_1—O—(C_nH_{2n}O)_m—R_2 \quad (II)$$

wherein $R_1$ and $R_2$, which may be the same as or different from each other, respectively represent a member selected from a hydrogen atom, radicals of the formulae: $—COCH_3$, $—CH_2OC_2H_5$, and $—C_2H_5OC_4H_7$, a benzyl radical and alkyl radicals having 1 to 4 carbon atoms, n is an integer of 1, 2 or 3 and m is an integer of 1, 2, 3 or 4.

The glycol compounds of the formula (II) preferably include ethyleneglycol dimethylether, ethyleneglycol diethylether, ethyleneglycol dibutylether, diethyleneglycol diethylether, diethyleneglycol dibutylether, ethyleneglycol monomethylether, ethyleneglycol monoethylether, ethyleneglycol monobutylether, ethyleneglycol monophenylether, 2,2'-dihydroxydiethylether, 2-(2-methoxyethoxy)ethanol, diethyleneglycol monoethylether, diethyleneglycol monobutylether, triethyleneglycol monomethylether, monomethylether, propyleneglycol monomethylether, propyleneglycol monoethylether, and tripropyleneglycol.

The polyethylene glycol component (D) is effective for enhancing the tenacity of the resultant hydrophilic membrane.

The polyethylene glycols usable for the component (D) preferably have a number average molecular weight in the range of from 200 to 20,000. When the molecular weight is less than 200, the resultant hydrophilic membrane sometimes exhibits an unsatisfactory resistance to water. Also, a polyethylene glycol having a molecular weight more than 20,000 sometimes causes the resultant fat-desensitizing liquid to have an excessively large viscosity and, thus, become inconvenient for handling.

In the fat-desensitizing composition of the present invention, the contents of the components (A), (B), (C), and (D) are not limited to specific values. Preferably, 100 parts by weight of the composition contains 0.4 to 20 parts, more preferably, 1 to 10 parts, by weight of the phytic acid component (A), 1 to 10 parts, more preferably 3 to 8 parts, by weight, of the glycol compound component (C), and 1 to 20 parts, more preferably 2 to 10 parts, by weight of the polyethylene glycol component (D). The content of the metal salt component (B) in the composition is preferably in the range of from 1 to 10 moles, more preferably from 4 to 6 moles, per mole of the phytic acid component (A).

The fat-desensitizing composition of the present invention may be added with at least one member selected from organic acids, for example, citric acid, tartaric acid, malonic acid, malic acid, adipic acid, and glycollic acid; antiseptics, for example, sodium dehydroacetate and salicylic acid; and a wetting agent consisting of at least one surface active agent.

The composition of the present invention comprising the phytic acid component (A) admixed with the specific metal salt component (B), the specific glycol compound component (C), and the specific polyethylene glycol component (D) is capable of rapidly carrying out the fat-desensitizing treatment for a litho printing plate face, especially, a surface of the photosensitive layer containing zinc oxide as a photoconductive substance, with an improved efficiency, and for forming a tenacious, hydrophilic membrane on the printing plate face.

When a face of a printing plate is treated with the fat-desensitizing composition of the present invention, the resultant hydrophilic membrane formed on the printing plate face exhibits an excellent tenacity comparable to that of non-image- formed portions formed on a printing face of a conventional aluminum PS printing plate. When the fat-desensitizing composition of the present invention is used for the preparation of an offset litho printing plate in accordance with an electrophotographic image-forming method, the resultant litho printing plate can produce clear prints by using a conventional dampening (damping) water. In this connection, a dampening water for an aluminum PS printing plate also can be used for the resultant litho printing plate to produce clear prints.

The specific examples and comparative examples presented below will serve to more fully elaborate the ways in which the present invention can be practically effected. It should be understood, however, that the examples are only illustrative and in no way limit the scope of the present invention.

EXAMPLE 1

A fat-desensitizing aqueous liquid was prepared by mixing 3 parts by weight of phytic acid with 2 parts by weight of copper (II) sulfate, 3 parts by weight of diethyleneglycol monobutylether, 2 parts by weight of a polyethylene glycol having a number average molecular weight of 800, and 90 parts by weight of water, and then adjusting the pH of the resultant liquid composition to a value of 3.0 by adding a necessary amount of 25% ammonia aqueous solution.

A conventional electrophotographic litho printing base plate with a photosensitive layer containing zinc oxide and a resinous binder was converted to a litho printing plate with a desired pattern of images by means of an ordinary electrophotographic platemaker.

The photosensitive layer surface of the resultant printing plate was manually treated with the fat-desensitizing liquid absorbed in an absorbent wadding.

The resultant offset printing plate was used for ordinary offset printing process by using an ordinary dampening water which was prepared by diluting an etching liquid produced by ITEK GRAPHIC CO. to a volume of 7 times the original volume of the etching liquid and which has been used for a usual electrophotographic printing plate having an photosensitive layer comprising zinc oxide and a resinous binder.

The above-mentioned procedures were repeated except that the surface of the photosensitive layer was treated with the fat-desensitizing liquid by means of an automatic etching machine (available under the trademark "Ricoh Processor").

The above-mentioned litho printing processes were repeated except that the dampening water was prepared by diluting the fat-desensitizing liquid to a volume 10 times the original volume thereof, or by diluting an etching liquid available under the trademark of Eu-1 and made by the Fuji Photographic Film Co. and usually used for aluminum PS plates, to a volume 32 times the original volume thereof.

The printing durability of the resultant offset printing plate was represented by the number of clear prints obtained without stains forming thereon.

The results are shown in Tables 1, 2, and 3.

EXAMPLE 2

The same procedures as those described in Example 1 were carried out with the following exception.

The fat-desensitizing liquid was prepared by mixing 5 parts by weight of phytic acid with 35 parts by weight of nickel citrate 14 hydrate, 6 parts by weight of ethyleneglycol monoethylether, 8 parts by weight of a polyethylene glycol having a number average molecular weight of 200, and 46 parts by weight of water, and then adjusting the pH of the resultant liquid composition to a value of 2.5 by using an aqueous solution containing 10% by weight of sodium hydroxide.

The results are shown in Tables 1, 2, and 3.

EXAMPLE 3

The same procedures as those described in Example 1 were carried out with the following exception.

The fat-desensitizing liquid was prepared by mixing 4 parts by weight of monopotassium phytate with 8 parts by weight of manganese acetate 4 hydrate, 2 parts by weight of ethyleneglycol monoethylether acetate, 2 parts by weight of a polyethylene glycol having a number average molecular weight of 1,000, and 84 parts by weight of water, and then adjusting the pH of the resultant liquid composition to a value of 3.0.

The results are shown in Tables 1, 2, and 3.

EXAMPLE 4

The same procedures as those described in Example 1 were carried out with the following exception.

The fat-desensitizing liquid was prepared by mixing 2 parts by weight of phytic acid with 2 parts by weight of nickel chloride 6 hydrate, 6 parts by weight of tripropyleneglycol monomethylether, 5 parts by weight of a polyethylene glycol having a number average molecular weight of 500, and 85 parts by weight of water, and then adjusting the pH of the resultant liquid composition to a value of 2.8.

The results are shown in Tables 1, 2, and 3.

EXAMPLE 5

The same procedures as those described in Example 1 were carried out with the following exception.

The fat-desensitizing liquid was prepared by mixing 3 parts by weight of phytic acid with 4 parts by weight of calcium acetate, 6 parts by weight of ethyleneglycol diethylether, 2 parts by weight of a polyethylene glycol having a number average molecular weight of 2,000, and 85 parts by weight of water, and then adjusting the pH of the resultant liquid composition to a value of 3.5.

The results are shown in Tables 1, 2, and 3.

EXAMPLE 6

The same procedures as those described in Example 1 were carried out with the following exception.

The fat-desensitizing liquid was prepared by mixing 3 parts by weight of phytic acid and 2 parts by weight of malic acid with 6 parts by weight of cobalt sulfate, 6 parts by weight of diethyleneglycol monoethylether, 10 parts by weight of a polyethylene glycol having a number average molecular weight of 300, and 73 parts by weight of water, and then adjusting the pH of the resultant liquid composition to a value of 3.1.

The results are shown in Tables 1, 2, and 3.

COMPARATIVE EXAMPLE 1

The same procedures as those described in Example 1 were carried out with the following exception.

A comparative fat-desensitizing liquid was prepared by mixing 3 parts by weight of phytic acid with 3 parts by weight of diethyleneglycol monobutylether, 2 parts by weight of a polyethylene glycol having a number average molecular weight of 800, and 92 parts by weight of water, and then adjusting the pH of the resultant liquid composition to a value of 3.0.

The results are shown in Table 1.

COMPARATIVE EXAMPLE 2

The same procedures as those described in Example 1 were carried out with the following exception.

The fat-desensitizing liquid was prepared by mixing 5 parts by weight of phytic acid with 35 parts by weight of nickel citrate 14 hydrate, 8 parts by weight of a polyethylene glycol having a number average molecular weight of 200, and 52 parts by weight of water, and then adjusting the pH of the resultant liquid composition to a value of 2.5.

The results are indicated in Table 1.

COMPARATIVE EXAMPLE 3

The same procedures as those described in Example 1 were carried out with the following exception.

The fat-desensitizing liquid was prepared by mixing 4 parts by weight of phytic acid with 8 parts by weight of manganese acetate 4 hydrate, 2 parts by weight of ethyleneglycol monoethylether, and 86 parts by weight of water, and then adjusting the pH of the resultant liquid composition to a value of 3.0.

The results are shown in Table 1.

COMPARATIVE EXAMPLE 4

The same procedures as those described in Example 1 were carried out with the following exception.

The fat-desensitizing liquid was prepared by mixing 2 parts by weight of phytic acid with 2 parts by weight of nickel chloride 6 hydrate, and 96 parts by weight of water, and then adjusting the pH of the resultant liquid composition to a value of 2.8.

The results are indicated in Table 1.

COMPARATIVE EXAMPLE 5

The same procedures as those described in Example 1 were carried out with the following exception.

The fat-desensitizing liquid was prepared by mixing 4 parts by weight of phytic acid with 2 parts by weight of ethyleneglycol monoethylether acetate and 94 parts by weight of water, and then adjusting the pH of the resultant liquid composition to a value of 3.2.

The results are shown in Table 1.

COMPARATIVE EXAMPLE 6

The same procedures as those described in Example 1 were carried out with the following exception.

The fat-desensitizing liquid was prepared by mixing 2 parts by weight of phytic acid with 5 parts by weight of a polyethylene glycol having a number average molecular weight of 1,000 and 93 parts by weight of water, and then adjusting the pH of the resultant liquid composition to a value of 3.0.

The results are shown in Table 1.

TABLE 1

(Dampening water: A seven times diluted aqueous solution of ITEK etching liquid)

| Example No. | Item: Number of clear prints free from stains — Manual etching | Automatic etching |
|---|---|---|
| Example | | |
| 1 | >3000 | >3000 |
| 2 | " | " |
| 3 | " | " |
| 4 | " | " |
| 5 | " | " |
| 6 | " | " |
| Comparative Example | | |
| 1 | about 100 | 0* |
| 2 | >3000 | about 100 |
| 3 | about 100 | 0* |
| 4 | 0* | 0* |
| 5 | 0* | 0* |
| 6 | 0* | 0* |

Note:
*The first print was stained

TABLE 2

(Dampening water: A ten times diluted aqueous solution of fat-desensitizing liquid)

| Example No. | | Item: Number of clear prints free from stains — Manual etching | Automatic etching |
|---|---|---|---|
| Example | 1 | >3000 | >3000 |
| | 2 | " | " |
| | 3 | " | " |
| | 4 | " | " |
| | 5 | " | " |
| | 6 | " | " |

TABLE 3

(Dampening water: A 32 times diluted aqueous solution of Fuji Etching Liquid Eu-1)

| Example No. | | Item: Number of clear prints free from stains — Manual etching | Automatic etching |
|---|---|---|---|
| Example | 1 | >3000 | >3000 |
| | 2 | " | " |
| | 3 | " | " |
| | 4 | " | " |
| | 5 | " | " |
| | 6 | " | " |

As Tables 1 to 3 clearly indicate, the fat-desensitizing liquids of Examples 1 to 6 resulted in an excellent printing durability of the litho printing plate which could produce 3,000 clear prints or more without forming stains on the prints. But, when the fat-desensitizing liquids of Comparative Examples 1 to 6 were used, the resultant comparative printing plates exhibited a poor printing durability when the etching operation was carried out manually and/or automatically.

Also, in Examples 1 to 6, even when the printing plate face was dampened by a dampening water consisting of the diluted solution of the fat-desensitizing liquid or by the commercial etching liquid for the usual aluminum PS plates, the resultant printing plate face exhibited an excellent printing durability, and 3,000 clear prints or more were continuously produced.

EXAMPLES 7 TO 12 AND COMPARATIVE EXAMPLES 7 TO 12

In each of Examples 7 to 12 and Comparative Examples 7 to 12, a piece of paper, which had been waterproof treated and had a thickness of 80 μm, was coated at a dry thickness of 15 μm with a coating paint consisting of 50 parts by weight of clay, 30 parts by weight of zinc oxide powder, 20 parts by weight of ammonium polyacrylate, 10 parts by weight of $NH_4OH$, 3 parts by weight of zinc acetate, and 113 parts by weight of water. The resultant coated paper was heated at a temperature of 120° C. for 5 minutes, to provide an offset master sheet for direct media. This master sheed had no photosensitive layer.

The offset master sheet was typewritten by means of a typewriter in which a fatty printing ribbon was used.

In each of Examples 7 to 12, the same procedures as those described in Example 1 were carried out except that the fat-desensitizing liquids used in Examples 7 to 12 were respectively the same as described in Examples 1 to 6, and the dampening water was prepared by diluting the fat-desensitizing liquid with water to a volume 10 times the original volume thereof.

In each of Comparative Examples 7 to 12, the same procedures as those described in Example 1 were carried out except that the fat-desensitizing liquids used in Comparative Examples 7 to 12 were respectively the same as described in Comparative Examples 1 to 6, and the wetting liquid was prepared by diluting the comparative fat-desensitizing liquid with water to a volume 10 times the original volume thereof.

The results of the offset printing process are shown in Table 4.

TABLE 4

(Dampening water: A ten times diluted aqueous solution of fat-desensitizing liquid)

| Example No. | | Item: Number of clear prints free from stains — Manual etching | Automatic etching |
|---|---|---|---|
| Example | 7 | >3000 | >3000 |
| | 8 | " | " |
| | 9 | " | " |
| | 10 | " | " |
| | 11 | " | " |
| | 12 | " | " |
| Comparative Example | 7 | 500 | 50 |
| | 8 | >3000 | 200 |
| | 9 | 500 | 10 |
| | 10 | 0* | 0* |
| | 11 | 0* | 0* |
| | 12 | 0* | 0* |

Note: * — The first print was stained

Table 4 clearly shows that the fat-desensitizing liquids of Examples 1 to 6, which were used respectively in Examples 7 to 12, were useful for producing direct image offset printing masters having an excellent printing durability of 3,000 clear prints or more.

Where the comparative fat-desensitizing liquids of Comparative Examples 1 to 6 were used respectively in Comparative Examples 7 to 12, however, the resultant comparative offset printing masters has a poor printing durability.

We claim:

1. A fat-desensitizing composition for litho printing plates, comprising (A) 0.4 to 2.0 parts by weight per 100 parts by weight of the composition of a phytic acid component consisting of at least one member selected from the group consisting of phytic acid and functional derivatives thereof;

(B) 1 to 10 moles per mole of phytic acid component (A) of a metal salt component consisting of at least one member selected from the group consisting of the compounds of the formula (I):

$$MX \qquad (I)$$

wherein M represents a divalent metal cation; X represents a member selected from monovalent and divalent anions; and represents an integer of 1 or 2, and hydrates of the above mentioned metal salts;

(C) 1 to 10 parts by weight per 100 parts by weight of the composition of a glycol compound component consisting of at least one member selected from compounds of the formula (II):

$$R_1{-}O\,({-}C_nH_{2n}O)_m{-}R_2 \qquad (II)$$

wherein $R_1$ and $R_2$ respectively represent, independently from each other, a member selected from the group consisting of hydrogen atoms and radicals of the formula; $-COOH_3$, $-CH_2OC_2H_5$, and $-C_2H_5OC_4H_7$, a benzyl radical, and alkyl radical having 1 to 4 carbon atoms, and wherein both $R_1$ and $R_2$ are not simultaneously hydrogen, n represents an integer of from 2 to 3, and m represents an integer of from 1 to 4;

(D) 1 to 20 parts by weight per 100 parts by weight of the composition of a polyethylene glycol component consisting of at least one polyethylene glycol having a number average molecular weight of from 200 to 20,000; and (E) the balance comprising water.

2. The composition as claimed in claim 1, wherein the divalent metal cation represented by M in the formula (I) is selected from the group consisting of Ni, Cu, Mg, Co, and Ca ions.

3. The composition as claimed in claim 1, wherein the anion represented by X in the formula (I), is selected from the group consisting of sulfate ion, acetate ion, monohydrogen phosphate ion, dihydrogenphosphate ion, citrate ion, and halogen ions.

4. The composition as claimed in claim 1, wherein the compound of the formula (II) in the glycol component (C) is selected from the group consisting of ethyleneglycol dimethylether, ethyleneglycol diethylether, ethyleneglycol dibutylether, diethyleneglycol diethylether, diethyleneglycol dibutylether, ethyleneglycol monomethylether, ethyleneglycol monoethylether, ethyleneglycol monobutylether, ethyleneglycol monophenylether, 2,2'-dihydroxydiethylether, 2-(2-methoxyethoxy)ethanol; diethyleneglycol monoethylether, diethyleneglycol monobutylether, triethylene- glycol, triethyleneglycol monomethylether, dipropyleneglycol, tripropyleneglycol monomethylether, tetraethyleneglycol, propyleneglycol monomethylether, propyleneglycol monoethylether,and tripropyleneglycol.

5. The composition as claimed in claim 1, wherein the functional derivative of phytic acid in the phytic acid component (A) are water-soluble monovalent and divalent metal salts of phytic acid.

6. The composition as claimed in claim 1, wherein the polyethylene glycol component (D) is in an amount of 2 to 10 parts by weight per 100 parts by weight of the composition.

7. The composition as claimed in claim 1, wherein the glycol component (C) is in an amount of 3 to 8 parts by weight per 100 parts by weight of the composition.

8. The composition as claimed in claim 1, wherein the phytic acid component (A) is in an amount of 1 to 10 parts by weight per 100 parts by weight of the composition.

9. The composition as claimed in claim 1, wherein the metal salt component (B) is in an amount of 4 to 6 moles per mole of the phytic acid component (A).

* * * * *